July 10, 1928.

F. C. OWEN 1,677,003

TRANSFORMER FOR ELECTRIC ARC CUTTING, REPAIRING, AND WELDING APPARATUS

Filed Aug. 18, 1927

Inventor
F. C. Owen,
By [signature]
Attorney

Patented July 10, 1928.

1,677,003

UNITED STATES PATENT OFFICE.

FREDERICK C. OWEN, OF FAYETTEVILLE, NORTH CAROLINA.

TRANSFORMER FOR ELECTRIC-ARC CUTTING, REPAIRING, AND WELDING APPARATUS.

Application filed August 18, 1927. Serial No. 213,880.

This invention relates to improvements in alternating current electric arc cutting, repairing and welding apparatus, and more particularly to improvements in the transformer for such apparatus which constitutes the subject-matter of my U. S. Patent 1,619,753, granted March 1, 1927, and which induces in its secondary winding a constant main voltage and a variable auxiliary voltage.

The present invention has for one of its objects to improve that transformer to the end that there will be induced in the secondary winding a constant main voltage and a plurality of variable auxiliary voltages, any one or more of which voltages may be employed to cut, repair or weld steel, wrought iron, cast iron, malleable iron, aluminum, brass, bronze, copper and other alloy metals.

Figure 1:
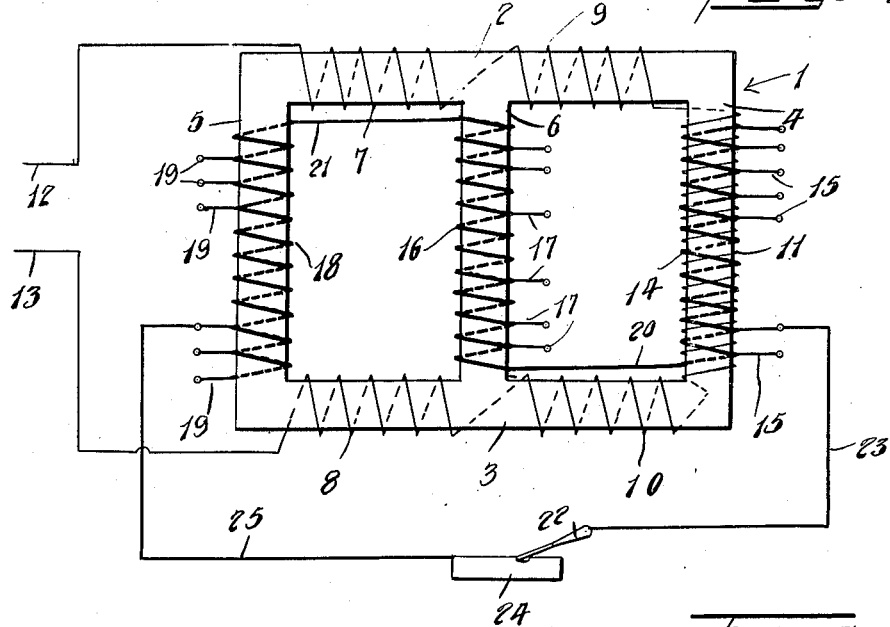
Figure 2:
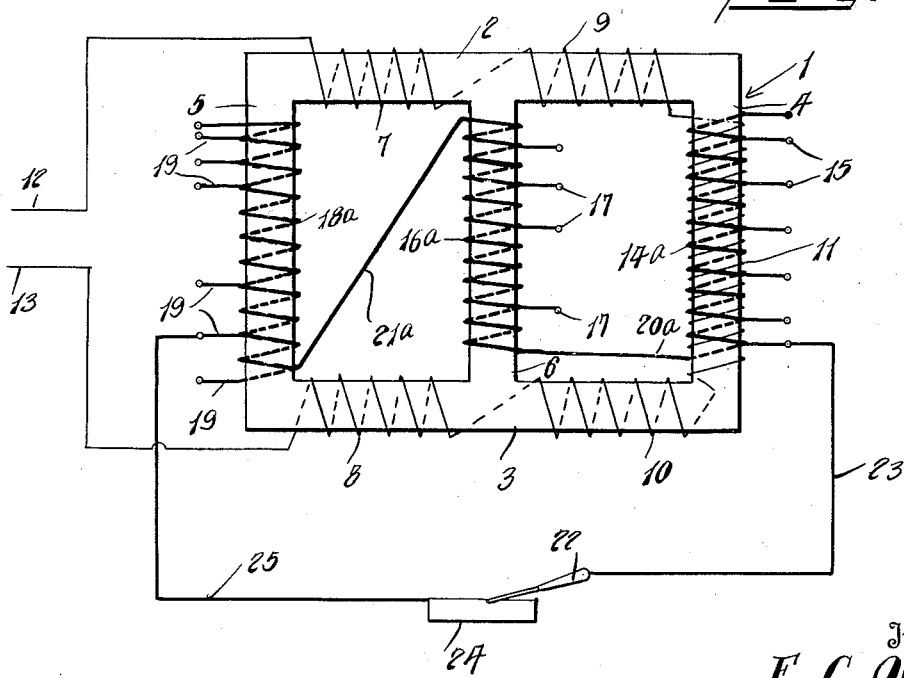

With the foregoing and other objects in view, the nature of which will appear as the description proceeds, the present invention consists of the construction, combination and arrangement of parts hereinafter fully described and claimed, and illustrated in the accompanying drawing, wherein:

Figure 1 is a diagrammatic view of an alternating current electric arc cutting, repairing and welding apparatus embodying a transformer constructed in accordance with the present invention, and Figure 2 is a similar view illustrating a slightly modified form of the transformer.

Referring in detail to the drawing, and more particularly to Figure 1, 1 designates a core which is of laminated construction and embodies a top leg 2, a bottom leg 3, side legs 4 and 5, and a middle leg 6.

The primary winding of the transformer comprises coils 7 and 8 mounted on the legs 2 and 3 at one side of the leg 6, coils 9 and 10 mounted on the legs 2 and 3 at the opposite side of the leg 6, and a coil 11 mounted on the leg 4. The coils are connected in series, and wires 12 and 13 connected to the terminals of the coils 7 and 8 extend to the power circuit.

The secondary winding of the transformer comprises a main coil 14 mounted on the leg 4 and provided with taps 15, an auxiliary coil 16 mounted on the leg 6 and provided with taps 17, and an auxiliary coil 18 mounted on the leg 5 and provided with taps 19. These coils are connected in series and similar relation by leads 20 and 21, and their connection is such that the output of the transformer is the sum of their voltages.

The cutting, repairing or welding electrode 22 is connected by a lead 23 to the main secondary coil 14, and the work 24 to be cut, repaired or welded is connected by a lead 25 to the auxiliary secondary coil 18.

As the main secondary coil 14 is closely coupled with the primary winding, practically all the flux developed by this winding will thread this coil, and flux in this part of the core 1 remains substantially constant at all loads. As the result, the voltage generated in this secondary coil 14 likewise remains practically the same at all times and does not vary with the load. As the auxiliary secondary coils 16 and 18 are loosely coupled with the primary winding, they set up fluxes independent of and opposed to that generated by the primary winding, and the reactions between these fluxes, which vary with the load, cause these auxiliary secondary coils to develop high inductances and act as impedance coils. It will thus be understood that a constant main voltage and variable secondary voltages are induced in the secondary winding. The reaction between these voltages is such that there is induced in the secondary circuit a light current at light load and a heavy current at heavy load, with the result that a stable arc of high power factor may be readily maintained during overhead, vertical and horizontal cutting, repairing or welding of the metals hereinbefore mentioned. Furthermore, the arc is free from sputtering and spitting, and it has been found that a skilled operator can maintain an arc within one and one-half per cent plus or minus of the rated capacity of the tap with which the electrode of the apparatus is connected.

The core 1 provides a plurality of closed magnetic paths. The main secondary coil 14 is distributed over a portion of one of these paths, the auxiliary secondary coil 18 is distributed over a portion of the other of these paths, and the auxiliary coil 16 is distributed over portions of both of these paths. The primary winding is distributed over a greater portion of one of the paths and over a lesser portion of the other, and the flux developed by this winding tends to hold the fluxes developed by the auxiliary secondary coils 16 and 18 in those portions of the paths over which these coils are distributed, with the result that the greatest and most effective reactions take place between these fluxes.

The electrode 22 and the work 24 may be connected to any one or two of the secondary coils 14, 16 and 18, and the provision of these coils with taps enables any required number of their ampere turns to be included in the secondary circuit.

As shown in Figure 2, the secondary winding may embody a reversely connected coil, in order that the output of the transformer will be the sum of the voltages of only two of the coils. The center coil 16ª is the reversely connected one, and it is connected in series with the coils 14ª and 18ª by leads 20ª and 21ª. This transformer is adapted to be used also as a bell ringing transformer, since little or no current will flow in its secondary winding on short circuit. The remaining parts of the apparatus shown in this figure are similar to the corresponding parts of the apparatus shown in Figure 1 and are designated by the same reference characters.

From the foregoing description, taken in connection with the accompanying drawing, the advantages of the construction and the method of the operation of the transformer will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

What is claimed is:—

1. A transformer comprising a core providing a plurality of magnetic paths, a primary winding distributed about the greater portion of one of said paths and about a portion of the other, and a secondary winding embodying a coil in close coupled relation with the primary winding and coils in loose coupled relation with the primary winding.

2. A transformer comprising a core providing a plurality of closed magnetic paths, a primary winding distributed around the greater portion of one of said paths and around a portion of the other, and a secondary winding embodying a main coil in close coupled relation with the primary winding and auxiliary coils in loose coupled relation with the primary winding.

3. A transformer comprising a core providing a plurality of magnetic paths, a primary winding distributed aroundt the greater portion of one of said paths and around a portion of the other, and a secondary winding embodying a coil in close coupled relation with the primary winding and coils in loose coupled relation with the primary winding, one of said coils embracing a plurality of said paths.

4. A transformer comprising a core providing a plurality of magnetic paths, a primary winding distributed around the greater portion of one of said paths and around a portion of the other, and a secondary winding embodying a main coil in close coupled relation with the primary winding and auxiliary coils in loose coupled relation with the primary winding, one of said auxiliary coils embracing a plurality of said paths.

5. A transformer comprising a core providing a plurality of magnetic paths, a primary winding distributed around the greater portion of one of said paths and around a portion of the other, and a secondary winding embodying a coil in close coupled relation with the primary winding and coils in loose coupled relation with the primary winding, said coils being connected in series.

6. A transformer comprising a core providing a plurality of magnetic paths, a primary winding distributed around the greater portion of one of said paths and a portion of the other, and a secondary winding embodying a coil in close coupled relation with the primary winding and coils in loose coupled relation with the primary winding, said coils being connected with one of them in reversed relation to the others.

7. A transformer comprising a core providing a plurality of closed magnetic paths, a primary winding distributed around the greater portion of one of said paths and a portion of the other, and a secondary winding embodying a main coil in close coupled relation with the primary winding and auxiliary coils in loose coupled relation with the primary winding, one of the auxiliary coils embracing a plurality of said paths and reversely connected with the other coils.

8. A transformer comprising a core providing a plurality of magnetic paths, a primary winding distributed around portions of said paths, and a secondary winding embodying a coil in close coupled relation with the primary winding and coils in loose coupled relation with the primary winding.

9. A transformer comprising a core having top, bottom, side and middle legs, a primary winding embodying coils distributed around the top, bottom and one side leg only, and a secondary winding embodying coils distributed around the side and middle legs.

In testimony whereof I affix my signature.

FREDERICK C. OWEN.